UNITED STATES PATENT OFFICE.

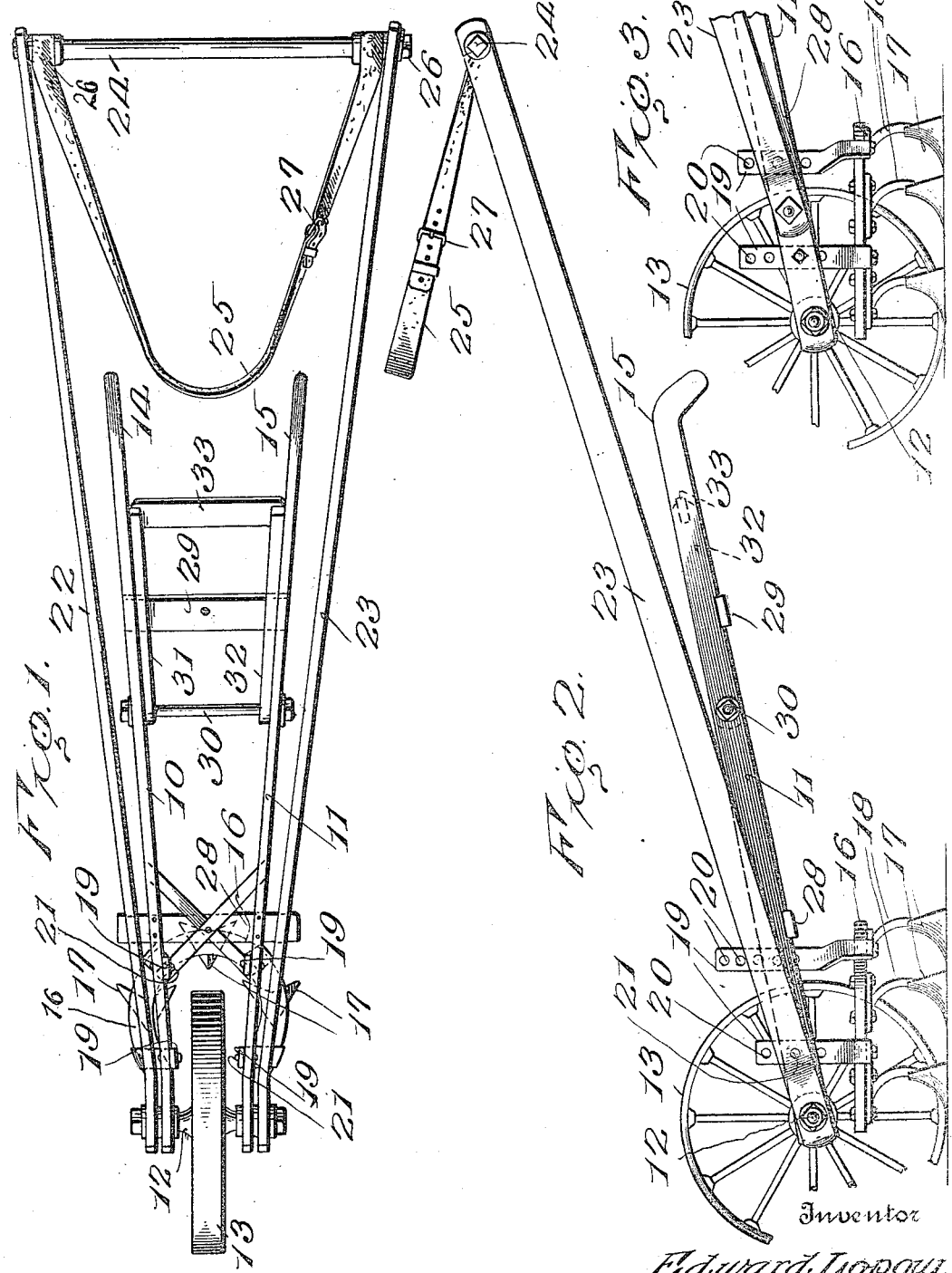

EDWARD LOPOUR, OF MARSHALLTOWN, IOWA.

HAND WHEEL-CULTIVATOR.

1,266,964.

Specification of Letters Patent. Patented May 21, 1918.

Application filed August 11, 1917. Serial No. 185,703.

*To all whom it may concern:*

Be it known that I, EDWARD LOPOUR, a citizen of the United States, residing at Marshalltown, in the county of Marshall and State of Iowa, have invented certain new and useful Improvements in Hand Wheel-Cultivators, of which the following is a specification.

This invention relates to attachments for manually guided implements such as garden hand wheel cultivators, weeders, lawn mowers and the like, and has for one of its objects to provide a simply constructed attachment to which a harness device is adapted to be applied whereby the weight and force of the body of the operator is utilized to push the implement forwardly, leaving the hands free to guide the same.

With these and other objects in view, the invention consists in certain novel features of construction, as hereinafter shown and described and then specifically pointed out in the claim; and in the drawings illustrative of the preferred embodiment of the invention—

Figure 1 is a plan view of the improved implement;

Fig. 2 is a side elevation of the parts shown in Fig. 1;

Fig. 3 is a side elevation of a portion of the improved device illustrating a modification of the construction.

Corresponding and like parts are referred to in the following description and indicated in all the views of the drawings by the same reference characters.

The improved device includes a frame comprising side members 10—11 connected at their forward ends to an axle 12, the latter carrying a ground wheel 13. The members 10—11 diverge rearwardly and terminate in hand grips 14—15, the latter preferably corresponding in outline to the ordinary hand grip portions of a plow. Disposed beneath the members 10—11 rearwardly of the axle 12 and the wheel 13 is a curved beam or support 16, which is preferably in horseshoe-shape as shown in Figs. 1 and 4 with its open side forwardly and bearing partially around the wheel 13. By this means the cultivator shovels, indicated conventionally at 17, are supported by their standards 18 in proper position. Any required number of the members 17 and their standards 18 may be employed, and the member 16 constructed in any required size, but for the purpose of illustration three of the standards 18 and the shovel members 17 are shown and operate rearwardly at each side of the ground wheel 13. The member 16 is coupled to the side members 11 by standards 19, each provided with a plurality of apertures 20 with which clamp bolts 21 engage, so that the members 19 together with the support 16 may be adjusted vertically to control the depth of cut of the shovels 17, as will be obvious.

Swingingly coupled to the members 10—11 are bars 22—23, the latter extending rearwardly of the hand grip portions 14—15 and connected at their rearward ends by a transverse member 24. The members 22—23 diverge toward their rear ends and extend for a considerable distance rearwardly of the handle portions 14—15 of the members 10—11, so that the coupling member 24 holds the members 22—23 in spaced relation and sufficiently spaced from the members 10—11 to prevent the hands of the operator coming in contact therewith when grasping the handles.

The harness, represented as a whole at 25, is connected to the member 24 as shown at 26 and is likewise provided with an adjusting buckle 27 to enable the length of the member 25 to be readily controlled.

By this simple arrangement it will be obvious that when the operator places the belt 25 over his shoulders or around his waist he is enabled to exert a pushing force against the bars 22—23 and thus transmit the force of his forward motion to the axle 12 and thence to the wheel 13, thus leaving both hands free to guide the implement by means of the handle members 14—15. The labor incident to actuating a garden cultivator is thus very materially decreased leaving both hands free to guide the implement and likewise obviating the necessity for exerting any pushing force with the hands or arms. The force required to propel the shovels forwardly is thus borne almost entirely by the body of the operator. The fatigue incident to the operating of garden cultivators and similar implements is thus very materially decreased, while at the same time the efficiency of the implement is correspondingly increased.

In Figs. 1 and 2 the bars 22—23 are shown pivoted directly to the axle 12, while in Fig. 3 the members 22—23 are pivoted to the members 10—11 rearwardly of the axle.

This arrangement may be employed without sacrificing any of the advantages of the invention as the results produced are precisely the same.

The members 10—12 are united adjacent to the members 19 by a transverse member 28, and likewise coupled near the hand grip ends by a transverse tie member 29.

Pivoted at 30 to the members 10—11 is a prop device including side members 31—32 and a brace member 33, the latter adapted to engage against the ground when the prop member is disposed in its lower position to serve as a prop or support for the device if required. When not in use the members 31—32 are foldable substantially into parallel relation to the members 10—11, and are supported by the inner face of the transverse members 29, as shown in Figs. 1 and 2.

The improved device is simple in construction, may be manufactured of any suitable material or combination of materials and of any required size.

Having thus described the invention, what is claimed as new is:

The combination with a manually guided apparatus including an axle, bearing wheel, and rearwardly extending handles swinging upon said axle and rigidly coupled in spaced relation, said handles supporting cultivator devices of coacting bars movably coupled at one end relatively to the handles and diverging and extending rearwardly of the handles, a rigid member connecting said bars at their rear ends and maintaining them constantly spaced from the vertical lines of the handles to permit the handles to be moved vertically without interfering with the bars, and a harness device connected to the rigid connecting member adjacent to the diverging bars and adapted to be disposed around the person of the operator while guiding the apparatus.

In testimony whereof I affix my signature.

EDWARD LOPOUR. [L. S.]

Copies of this patent may be obtained for five cents each, by addressing the "Commissioner of Patents, Washington, D. C."